United States Patent
Keys et al.

(10) Patent No.: US 7,863,224 B2
(45) Date of Patent: Jan. 4, 2011

(54) WELLBORE SERVICING COMPOSITIONS COMPRISING A SET RETARDING AGENT AND METHODS OF MAKING AND USING SAME

(75) Inventors: Crystal Lynne Keys, Lawton, OK (US); Lance E. Brothers, Chickasha, OK (US)

(73) Assignee: Halliburton Energy Services Inc., Duncan, OK (US)

( * ) Notice: Subject to any disclaimer, the term of this patent is extended or adjusted under 35 U.S.C. 154(b) by 99 days.

(21) Appl. No.: 12/406,110

(22) Filed: Mar. 17, 2009

(65) Prior Publication Data

US 2010/0240556 A1 Sep. 23, 2010

(51) Int. Cl.
*C04B 7/32* (2006.01)
*C09K 8/42* (2006.01)
*E21B 33/13* (2006.01)

(52) U.S. Cl. .................. 507/235; 106/695; 106/705; 106/287.27; 106/287.29; 166/285; 166/293; 507/274

(58) Field of Classification Search .................. 507/235, 507/274; 106/695, 705, 287.27, 287.29; 166/285, 293
See application file for complete search history.

(56) References Cited

U.S. PATENT DOCUMENTS

| | | | |
|---|---|---|---|
| 3,180,748 A | 4/1965 | Holmgren, et al. | |
| 3,817,770 A * | 6/1974 | Dunworth et al. | 106/694 |
| 4,941,536 A | 7/1990 | Brothers et al. | |
| 4,997,487 A | 3/1991 | Vinson et al. | |
| 5,049,288 A | 9/1991 | Brothers et al. | |
| 5,263,542 A | 11/1993 | Brothers | |
| 5,340,397 A | 8/1994 | Brothers | |
| 5,346,012 A | 9/1994 | Heathman et al. | |
| 5,472,051 A | 12/1995 | Brothers | |
| 5,484,478 A | 1/1996 | Brothers | |
| 5,488,991 A | 2/1996 | Cowan et al. | |
| 5,536,311 A | 7/1996 | Rodrigues | |
| 5,588,488 A | 12/1996 | Vijn et al. | |
| 5,672,203 A | 9/1997 | Chatterji et al. | |
| 5,871,577 A | 2/1999 | Chatterji et al. | |
| 5,900,053 A | 5/1999 | Brothers et al. | |
| 5,913,364 A | 6/1999 | Sweatman | |
| 6,060,434 A | 5/2000 | Sweatman et al. | |
| 6,143,069 A | 11/2000 | Brothers et al. | |
| 6,167,967 B1 | 1/2001 | Sweatman | |
| 6,258,757 B1 | 7/2001 | Sweatman et al. | |
| 6,332,921 B1 | 12/2001 | Brothers et al. | |
| 6,488,763 B2 | 12/2002 | Brothers et al. | |
| 6,723,334 B1 * | 4/2004 | McGee et al. | 424/423 |
| 6,796,378 B2 | 9/2004 | Reddy et al. | |
| 6,846,357 B2 | 1/2005 | Reddy et al. | |
| 6,887,833 B2 | 5/2005 | Brothers et al. | |
| 6,904,971 B2 | 6/2005 | Brothers et al. | |
| 6,978,835 B1 | 12/2005 | Reddy et al. | |
| 7,021,380 B2 | 4/2006 | Caveny et al. | |
| 7,147,055 B2 | 12/2006 | Brothers et al. | |
| 7,255,739 B2 | 8/2007 | Brothers et al. | |
| 7,337,842 B2 | 3/2008 | Roddy et al. | |
| 7,381,263 B2 | 6/2008 | Roddy et al. | |
| 7,435,293 B2 | 10/2008 | Caveny et al. | |
| 7,478,675 B2 | 1/2009 | Roddy et al. | |

FOREIGN PATENT DOCUMENTS

WO 2004055321 A1 7/2004
WO 2008117020 A1 10/2008

OTHER PUBLICATIONS

Secar 51 Product Data Sheet, Jun. 1998, 1 page, Lafarge Calcium Aluminates, Inc.
Secar 60 Product Data Sheet, Jun. 1998, 1 page, Lafarge Calcium Aluminates, Inc.
Berard, Brian, et al., "Foamed calcium aluminate phosphate cement enables drilling and cementation of California geothermal wells," SPE 120845, 2009, pp. 1-6, Society of Petroleum Engineers.
Brothers, Lance E., et al., "Synthetic retarder for high-strength cement," SPE/IADC 21976, 1991, pp. 659-665, SPE/IADC Drilling Conference.
Halliburton brochure entitled "HR®-5 cement additive," 1998, 2 pages, Halliburton Energy Services, Inc.
Halliburton brochure entitled "SCR-100TM cement retarder," May 2006, 1 page, Halliburton.
Halliburton brochure entitled "WellLife® III cementing service for CO2 environments," Apr. 2009, pp. 1-4, Halliburton.
Kukacka, Lawrence E., et al., "Lightweight CO2-resistant cements for geothermal well completions," 4 pages, undated, and publisher unknown but admitted to be prior art.
Santra, Ashok, et al., "Reaction of CO2 with Portland cement at downhold conditions and the role of pozzolanic supplements," SPE 121103, 2009, pp. 1-9, Society of Petroleum Engineers.
Sugama, T., et al., "Carbonation of hydrothermally treated phosphate-bonded calcium aluminate cements," undated, pp. 1-10 plus 1 cover page, published under the auspices of the U.S. Department of Energy, Washington D.C. under contract No. DE-AC02-76CH00016.
Sugama, Toshifumi, et al., "Calcium phosphate cements prepared by acid-base reaction," Aug. 1992, pp. 2076-2087, vol. 75, No. 8, Journal of the American Ceramic Society.

(Continued)

Primary Examiner—Timothy J. Kugel
(74) Attorney, Agent, or Firm—Craig W. Roddy; Conley Rose

(57) ABSTRACT

A method of servicing a wellbore comprising preparing a composition comprising a calcium aluminate cement, water, a polyphosphate, a pozzolan, and a set retarding agent, wherein the set retarding agent comprises an alkali halide and a basic phosphate salt, placing the composition in the wellbore and allowing the composition to set. A composition comprising a calcium aluminate cement in an amount of from about 30 wt. % to about 60 wt. % and a set retarding agent in an amount of from about 0.1 wt. % to about 15 wt. % based upon the total weight of the composition, wherein the set retarding agent comprises an alkali halide and a basic phosphate salt in a ratio of from about 3:1 to about 1:3.

20 Claims, No Drawings

OTHER PUBLICATIONS

Sugama, T., "Hot alkali carbonation of sodium metaphosphate modified fly ash/calcium aluminate blend hydrothermal cements," Cement and Concrete Research, pp. 1661-1672, vol. 26, No. 11, Pergamon, Elsevier Science Ltd, USA.

Sugama, T., et al., "Interfaces and mechanical behaviors of fiber-reinforced calcium phosphate cement composites," Jun. 1992, pp. 1-36 plus 1 cover page and 1 publishing page, published under the auspices of the U.S. Department of Energy, Washington D.C. under contract No. DE-AC0276CH00016, prepared for the Department of Applied Science, Geothermal Division.

Sugama, Toshifumi, et al., "Microsphere-filled lightweight calcium phosphate cements," Dec. 1992, pp. iii, 1-36, and 1 cover page, published under the auspices of the U.S. Department of Energy, Washington D.C. under contract No. DE-AC02-76CH00016.

Sugama, T., et al., "Mullite microsphere-filled lightweight calcium phosphate cement slurries for geothermal wells: setting and properties," Cement and Concrete Research, 1995, pp. 1305-1310, vol. 25, No. 6, Pergamon, Elsevier Science Ltd, USA.

Sugama, T., et al., "Sodium-polyphospate-modified fly ash/calcium aluminate blend cement: durability in wet, harsh geothermal environemnts," Materials Letters, May 2000, pp. 45-53, vol. 44, Elsevier Science B.V.

Foreign communication from a related counterpart application - International Search Report and Written Opinion, PCT/GB2010/000453, Jun. 10, 2010, 11 pages.

Myrdal, Roar, "Retarding admixtures for concrete," XP-002583015, Dec. 19, 2007, pp. 1-23, SINTEF Report, Norway.

Parr, Christopher, et al., "The impact of calcium aluminate cement hydration upon the properties of refractory castables," XP-002582968, Technical Paper TP-GB-RE-LAF-043, Sep. 2004, pp. 1-17, Kerneos Aluminate Technologies.

Rodger, S. A., et al., "The chemistry of hydration of high alumina cement in the presence of accelerating and retarding admixtures," XP-002582967, Cement and Concrete Research, 1984, pp. 73-82, vol. 14, Pergamon Press, Ltd.

Sugama, T., "Calcium aluminate cements in fly ash/calcuim aluminate blend phosphate cement systems: Their role in inhibiting carbonation and acid corrosion at a low hydrothermal temperature of 90°C," XP-002582969, Journal of Materials Science, 2002, pp. 3163-3173, vol. 37, Kluwer Academic Publishers.

* cited by examiner

WELLBORE SERVICING COMPOSITIONS COMPRISING A SET RETARDING AGENT AND METHODS OF MAKING AND USING SAME

BACKGROUND

1. Technical Field

The present disclosure generally relates to servicing a wellbore. More particularly, this disclosure relates to servicing a wellbore with calcium alumina cement compositions comprising a set retarding agent and methods of making and using same.

2. Background

Natural resources such as gas, oil, and water residing in a subterranean formation or zone are usually recovered by drilling a wellbore down to the subterranean formation while circulating a drilling fluid in the wellbore. After terminating the circulation of the drilling fluid, a string of pipe, e.g., casing, is run in the wellbore. The drilling fluid is then usually circulated downward through the interior of the pipe and upward through the annulus, which is located between the exterior of the pipe and the walls of the wellbore. Next, primary cementing is typically performed whereby a cement slurry is placed in the annulus and permitted to set into a hard mass (i.e., sheath) to thereby attach the string of pipe to the walls of the wellbore and seal the annulus. Subsequent secondary cementing operations may also be performed.

Wellbore servicing fluids are often modified to allow them to function for their intended purpose under extreme conditions (e.g., high temperatures/pressures, acidic environment). At high static subterranean temperatures, and in the presence of brines containing carbon dioxide, conventional hydraulic cements rapidly deteriorate due to alkali carbonation. Thus, the use of conventional hydraulic cement compositions in these types of environments may result in the loss of wellbore integrity. An alternative to conventional hydraulic cements when cementing in challenging environments such as steam injection wells or steam production wells is calcium aluminate based cement (CABC). The higher temperature resistance of CABC when compared to Portland cement/silica mixtures is an advantage for long term integrity of the cement sheath. The use of CABC offers many advantages as they provide in addition to high and low temperature resistance, resistance to sulfates, corrosion and sour gas. Additional examples of wellbore servicing operations that typically employ CABC include the servicing of geothermal wells or carbon dioxide injection wells. Calcium Aluminate Cements (CACs) combined with a soluble phosphate salt, for example sodium metaphosphate and a pozzolanic material such as Class F fly ash, form quick setting cement compositions that upon setting bind well to the subterranean formation and to itself and display desirable mechanical properties such as high strength, carbonation resistance, low permeability, and improved corrosion resistance.

A variety of CACs are commercially available with varying alumina contents. While attractive from an economic standpoint, one drawback to the use of CACs is their unpredictable thickening times. As such, the unpredictable thickening times of CAC slurries make well cementing with these types of cement a challenge. A need therefore exists for materials that can retard the CAC slurries so that the CAC slurry may display predictable thickening times and remain pumpable before they are placed into the desired location.

SUMMARY

Disclosed herein is a method of servicing a wellbore comprising preparing a composition comprising a calcium aluminate cement, water, a polyphosphate, a pozzolan, and a set retarding agent, wherein the set retarding agent comprises an alkali halide and a basic phosphate salt, placing the composition in the wellbore and allowing the composition to set.

Also disclosed herein is a composition comprising a calcium aluminate cement in an amount of from about 30 wt. % to about 60 wt. % and a set retarding agent in an amount of from about 0.1 wt. % to about 15 wt. % based upon the total weight of the composition, wherein the set retarding agent comprises an alkali halide and a basic phosphate salt in a ratio of from about 3:1 to about 1:3.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are wellbore servicing compositions comprising a calcium aluminate cement (CAC), a polyphosphate salt, fly ash, and a set retarding agent (SRA) and methods of using same. The SRA may comprise an alkali halide and a basic phosphate salt. The wellbore servicing compositions comprising a CAC, a polyphosphate salt, fly ash, and an SRA of the type described herein may be placed downhole to service a wellbore and may display desirable mechanical and/or physical properties.

In an embodiment, the wellbore servicing composition comprises a CAC, which further comprises calcium, aluminum, and oxygen, and sets and hardens by reaction with water. In an embodiment, the CAC comprises aluminum oxide ($Al_2O_3$) and calcium oxide (CaO). The aluminum oxide may be present in the CAC in an amount of from about 30 wt. % to about 80 wt. %, alternatively from about 40 wt. % to about 70 wt. %, alternatively from about 50 wt. % to about 60 wt. %, based upon the total weight of the CAC; and the calcium oxide may be present in the CAC in an amount of from about 20 wt. % to about 60 wt. %, alternatively from about 30 wt. % to about 50 wt. %, alternatively from about 35 wt. % to about 40 wt. %, based upon the total weight of the CAC. Additionally, the aluminum oxide to calcium oxide ($Al_2O_3$/CaO) weight ratio in the CAC may vary from about 1:1 to about 4:1, alternatively from about 2:1 to about 1.5:1.

The wellbore servicing composition comprising a CAC, when mixed in an aqueous fluid, may have a pH in the range of from about 3 to about 10, alternatively from about 4 to about 9, alternatively from about 6 to about 8. In an embodiment, the CAC may be present in the wellbore servicing composition in an amount of from about 30 weight percent (wt. %) to about 60 wt. %, alternatively from about 35 wt. % to about 55 wt. %, alternatively from about 40 wt. % to about 50 wt. %, based upon the total weight of the wellbore servicing composition.

Non limiting examples of CACs suitable for use in this disclosure include SECAR 80, SECAR 60, SECAR 71, SECAR 41, and SECAR 51, which are commercially available from KERNEOS INC., Cheasapeake, Va.; CA-14, CA-270, and CA-25 cements commercially available from Almatis, Inc., Leetsdale, Pa.; and THERMALOCK cement, which is commercially available from Halliburton Energy Services, Inc. In an embodiment, a CAC (e.g., SECAR 51) has generally the chemical composition and properties set forth in Table 1.

TABLE 1

| | SECAR 51 Typical Value | Method |
|---|---|---|
| Chemical Composition | | |
| $Al_2O_3$ | $\geq 50.0$ | — |
| CaO | $\leq 39.0$ | — |
| $SiO_2$ | $\leq 5.0$ | — |
| $TiO_2$ | $<4$ | — |
| $Fe_2O_3$ | $\leq 3.0$ | — |
| MgO | $<1.0$ | — |
| $SO_3$ | $<0.4$ | — |
| $K_2N + Na_2O$ soluble | $<0.4$ | — |
| Physical Properties | | |
| Bulk density (g/cm3) | 1.07-1.26 | — |
| Specific gravity (g/cm3) | 3.0 | — |
| Fineness (cm2/g) | 3600-4400 | Blaine Apparatus |
| Residue at 90 microns | $<5$ | — |
| Sand Mortar Properties | | |
| Flow at 30 min (%) | $\geq 40$ | ASTM C230 |
| Initial set (minutes) | $\geq 160$ | Vicat needle |
| Compressive Strength at 6 hour (psi) | $\geq 3900$ | ASTM C349 |
| Compressive Strength at 24 hour (psi) | $\geq 7800$ | ASTM C349 |

In an embodiment the wellbore servicing composition comprises an SRA. SRAs are materials that function to alter (e.g., extend) the time required for the composition to undergo the phase transition from a fluid slurry to a set solid mass. Such materials may allow the operator to control the thickening time (as described herein) of the composition to meet some user and/or process-desired need. SRAs may further function to delay the hydration of cement without affecting the long-term mechanical properties.

In an embodiment, the SRA comprises an alkali halide. Examples of alkali halides suitable for use in this disclosure include without limitation sodium chloride (NaCl), calcium chloride ($CaCl_2$), potassium chloride (KCl), or combinations thereof.

In an embodiment the SRA comprises a basic phosphate salt. The basic phosphate salt may be a monobasic, a dibasic, or a tribasic phosphate salt. Example of basic phosphate salts suitable for use in this disclosure include without limitation sodium phosphate monobasic, sodium phosphate dibasic, sodium phosphate tribasic, calcium phosphate monobasic, calcium phosphate dibasic, calcium phosphate tribasic, potassium phosphate monobasic, potassium phosphate dibasic, potassium phosphate tribasic, or combinations thereof.

In an embodiment, the SRA is a mixture of an alkali halide and a basic phosphate salt wherein the components may be in a ratio of alkali halide:basic phosphate salt of from about 3:1 to about 1:3, alternatively from about 2:1 to about 1:2, alternatively from about 1.5:1 to about 1:1.5. In an embodiment, the SRA comprises a mixture of an alkali halide and a basic phosphate salt, for example a mixture of sodium chloride and sodium phosphate monobasic. In an embodiment the SRA comprises a 50:50 mixture of NaCl and $NaH_2PO_4$.

In an embodiment, the SRA is present in the wellbore servicing composition in an amount of from about 0.1 wt. % to about 15 wt. %, alternatively from about 0.3 wt. % to about 10 wt. %, alternatively from about 1 wt. % to about 8 wt. %, based upon the total weight of the wellbore servicing composition.

In an embodiment, the wellbore servicing composition further comprises a polymeric phosphate salt, for example a polyphosphate salt. The polymeric phosphate salt functions to combine with calcium and form calcium phosphate compounds. A polymeric phosphate salt suitable for use in this disclosure may be represented by the general formula: $(NaPO_3)_n$, where n represents the degree of polymerization of the phosphate unit. In an embodiment, n ranges from about 3 to about 30, alternatively from about 10 to about 25, alternatively from about 4 to about 7. In some embodiments, the polymeric phosphate salt further comprises an alkali metal. Nonlimiting examples of polymeric phosphate salts suitable for use in this disclosure include sodium (hexa)metaphosphate (SHMP), sodium tripolyphosphate, or combinations thereof. In an embodiment, the polymeric phosphate salt may be present in the wellbore servicing composition in an amount of from about 1 wt. % to about 20 wt. %, alternatively from about 2 wt. % to about 10 wt. %, or alternatively from about 3 wt. % to about 8 wt. %, or alternatively from about 3 wt. % to about 6 wt. % based upon the total weight of CAC.

In an embodiment, the wellbore servicing composition further comprises a pozzolan such as for example and without limitation ASTM Class F fly ash. Class F fly ash is produced from the burning of anthracite and bituminous coal. Such fly ash is pozzolanic in nature and contains less than 10% lime (CaO). In an embodiment, the fly ash may be present in the wellbore servicing composition in an amount of from about 30 wt. % to about 60 wt. %, alternatively from about 35 wt. % to about 55 wt. %, alternatively from about 40 wt. % to about 50 wt. %, based upon the total weight of the wellbore servicing composition.

In some embodiments, the wellbore servicing composition comprises a conventional set retarder. Conventional set retarders herein refer to materials which function to delay the onset of hydration of the cementitious materials and do not comprise SRAs of the type disclosed herein. Examples of conventional set retarders include without limitation organic acids, alkali metal salts of organic acid, lignosulfonates, and the like. Examples of organic acids and their salts that may function as a conventional set retarder include without limitation tartaric acid, citric acid, oxalic acid, gluconic acid, oleic acid, uric acid, ethylenediaminetetraacetic acid (EDTA), sodium citrate, or combinations thereof. Other examples of conventional set retarders include HR-5 set retarder, which is a chemically modified lignosulfonate, SCR-100 set retarder which is a nonlignosulfonate cement retarder and organic acid containing retarders HR-25 and FE-2 all of which are commercially available from Halliburton Energy Services, Inc.

The wellbore servicing composition may include a sufficient amount of water to form a pumpable slurry. The water may be fresh water or salt water, e.g., an unsaturated aqueous salt solution or a saturated aqueous salt solution such as brine or seawater. The water may be present in the amount from about 20 wt. % to about 180 wt. %, alternatively from about 28 wt. % to about 60 wt. %, based upon the total weight of the cement. The amount of water may depend on the desired density of the cement slurry and the desired slurry rheology and as such may be determined by one of ordinary skill in the art with the aid of this disclosure.

In some embodiments, additives may be included in the wellbore servicing composition for improving or changing the properties thereof. Examples of such additives include but are not limited to, defoamers, foaming surfactants, fluid loss agents, weighting materials, latex emulsions, dispersants, vitrified shale, or other fillers such as silica flour, sand and slag, formation conditioning agents, hollow glass, ceramic beads, or combinations thereof. Other mechanical property modifying additives, for example, elastomers, carbon fibers, glass fibers, metal fibers, minerals fibers, and the like can be added to further modify the mechanical properties. These additives may be included singularly or in combination. Methods for introducing these additives and their effective amounts are known to one of ordinary skill in the art with the aid of this disclosure.

In an embodiment, a wellbore servicing composition comprises a CAC, water, an SRA (e.g., sodium chloride and sodium phosphate monobasic), a pozzolan (e.g., fly ash), and a polymeric phosphate salt (e.g., sodium (hexa)metaphosphate (SHMP) and/or sodium tripolyphosphate) of the type disclosed herein. Alternatively, the wellbore servicing composition comprises a CAC, water, an SRA (e.g., sodium chloride and sodium phosphate monobasic), a polymeric phosphate salt (e.g., sodium (hexa)metaphosphate (SHMP) and/or sodium tripolyphosphate), a pozzolan (e.g., fly ash), and a conventional set retarder of the type disclosed herein.

In an embodiment, the wellbore servicing composition comprises a CAC in an amount of from about 40 wt. % to about 50 wt. %; a 50:50 mixture of NaCl and $NaH_2PO_4$ in an amount of from about 0.5 wt. % to about 10 wt. %; fly ash in an amount of from about 40 wt. % to about 50 wt %; and a polymeric phosphate salt in an amount of from about 3 wt. % to about 6 wt. % wherein the weight percent is based on the total weight of the dry solids.

The components of the wellbore servicing composition comprising an SRA as described herein may be combined in any order desired by the user to form a slurry that may then be placed into a wellbore. The components of the wellbore servicing composition comprising an SRA may be combined using any mixing device compatible with the composition, for example a bulk mixer or a recirculating mixer.

The wellbore servicing compositions comprising an SRA as disclosed herein may be characterized by an increased thickening time when compared to an otherwise similar composition lacking an SRA (e.g., an otherwise similar composition using a conventional retarder in contrast to an SRA described herein such as a combination of an alkali halide and a basic phosphate salt). The thickening time refers to the time required for the composition to achieve 70 Bearden units of Consistency (Bc). At about 70 Bc, the slurry undergoes a conversion from a pumpable fluid state to a non-pumpable paste. In an embodiment, the wellbore servicing composition comprising an SRA may have a thickening time of greater than about 2 hours, alternatively greater than about 3 hours, alternatively greater than about 4 hours, at temperatures of from about 100° F. to about 300° F., alternatively from about 125° F. to about 275° F., alternatively from about 150° F. to about 250° F.

In an embodiment the wellbore servicing composition comprising an SRA converts into a hard mass soon after mixing, for example within about 1 hour to about 24 hours after mixing, alternatively from about 2 hours to about 12 hours, alternatively from about 5 hours to about 8 hours. The set cement may exhibit a compressive strength of from about 250 psi to about 20,000 psi, alternatively from about 500 psi to about 5,000 psi, alternatively from about 1,000 psi to about 3,000 psi. Herein the compressive strength is defined as the capacity of a material to withstand axially directed pushing forces. The maximum resistance of a material to an axial force is determined in accordance with American Petroleum Institute (API) Recommended Practice 10B, $22^{nd}$ Edition, December 1997. Beyond the limit of the compressive strength, the material becomes irreversibly deformed and no longer provides structural support and/or zonal isolation.

In an embodiment, SRA may be utilized (alone or in combination with one or more conventional retarders) in compositions comprising non-CAC cements. For example, the SRA may be used (alone or in combination with one or more conventional retarders) in a wellbore servicing composition comprising a Portland cement, or a Sorel cement. In such embodiments, the SRA may be less effective at delaying the hydration of the cementitious material. In an embodiment, the SRA is employed in wellbore servicing compositions comprising cementitious materials which consist of or consist essentially of CACs.

The cementitious compositions comprising an SRA disclosed herein can be used for any purpose. In an embodiment, the cementitious compositions comprising an SRA disclosed herein are used as wellbore servicing compositions to service a wellbore that penetrates a subterranean formation. It is to be understood that "subterranean formation" encompasses both areas below exposed earth and areas below earth covered by water such as ocean or fresh water. Servicing a wellbore includes, without limitation, positioning the wellbore servicing composition comprising an SRA in the wellbore to isolate the subterranean formation from a portion of the wellbore; to support a conduit in the wellbore; to plug a void or crack in the conduit; to plug a void or crack in a cement sheath disposed in an annulus of the wellbore; to plug a perforation; to plug an opening between the cement sheath and the conduit; to prevent the loss of aqueous or nonaqueous drilling fluids into loss circulation zones such as a void, vugular zone, or fracture; to plug a well for abandonment purposes; a temporary plug to divert treatment fluids; and to seal an annulus between the wellbore and an expandable pipe or pipe string. For instance, the wellbore servicing composition comprising an SRA may set in a loss-circulation zone and thereby restore circulation. The set composition plugs the zone and inhibits loss of subsequently pumped drilling fluid, which allows for further drilling. Methods for introducing compositions into a wellbore to seal subterranean zones are described in U.S. Pat. Nos. 5,913,364; 6,167,967; and 6,258,757, each of which is incorporated by reference herein in its entirety.

In an embodiment, the wellbore servicing compositions comprising an SRA may be employed in well completion operations such as primary and secondary cementing operations. Said compositions may be placed into an annulus of the wellbore and allowed to set such that it isolates the subterranean formation from a different portion of the wellbore. The wellbore servicing compositions comprising an SRA thus form a barrier that prevents fluids in that subterranean formation from migrating into other subterranean formations. Within the annulus, the fluid also serves to support a conduit, e.g., casing, in the wellbore.

In an embodiment, the wellbore in which the wellbore servicing compositions comprising an SRA are positioned belongs to a multilateral wellbore configuration. It is to be understood that a multilateral wellbore configuration includes at least two principal wellbores connected by one or more ancillary wellbores. In secondary cementing, often referred to as squeeze cementing, the wellbore servicing composition comprising an SRA may be strategically positioned in the wellbore to plug a void or crack in the conduit, to plug a void or crack in the hardened sealant (e.g., cement sheath) residing in the annulus, to plug a relatively small opening known as a microannulus between the hardened sealant and the conduit, and so forth, thus acting as a sealant composition.

Various procedures that may be followed to use a wellbore servicing composition in a wellbore are described in U.S. Pat. Nos. 5,346,012 and 5,588,488, which are incorporated by reference herein in their entirety.

EXAMPLES

The disclosure having been generally described, the following examples are given as particular embodiments of the disclosure and to demonstrate the practice and advantages thereof. It is understood that the examples are given by way of illustration and are not intended to limit the specification or the claims in any manner.

Example 1

The gelation times of calcium aluminate cement compositions comprising various retarders were investigated. Nine cement slurries, designated Samples 1-9, were prepared using the indicated amounts of Class F fly ash, SECAR 51, sodium hexametaphosphate (SHMP), FE-2 organic acid, sodium chloride (NaCl), sodium phosphate monobasic ($NaH_2PO_4$), HR-5 cement retarder, SCR-100 cement retarder, HR-25 cement retarder, a mixture of SCR-100, FE-2, and NaCl, a mixture of sodium phosphate monobasic and NaCl, and deionized (DI) water. The amounts of these components in each slurry are indicated in Table 2. SECAR 51 is a calcium aluminate hydraulic cement having an alumina content of about 58% and commercially available from KERNEOS INC. FE-2 is an iron sequestering agent, HR-5 is a chemically modified lignosulfonate, SCR-100 is a nonlignosulfonate cement retarder, and HR-25 is a high temperature retarder, each of which is commercially available from Halliburton Energy Services, Inc. The gelation times were determined for Samples 1-8 by letting the samples sit static under ambient conditions and for Sample 9 in an atmospheric cement consistometer, which is commercially available from Halliburton Energy Services, Inc. and the results are tabulated in Table 2.

TABLE 2

| Sample | fly ash (g) | SECAR 51 (g) | SHMP (g) | DI Water (g) | Set Retarder Types | Set Retarder Amounts (g) | Gelation time |
|---|---|---|---|---|---|---|---|
| 1 | 380 | 380 | 40 | 304 | FE-2 | 8 | 20 minutes |
| 2 | 380 | 380 | 40 | 304 | NaCl | 8 | 11 minutes |
| 3 | 380 | 380 | 40 | 304 | $NaH_2PO_4$ | 8 | 10 minutes |
| 4 | 380 | 380 | 40 | 304 | HR-5 | 8 | 10 minutes |
| 5 | 380 | 380 | 40 | 304 | SCR-100 | 8 | 15 minutes |
| 6 | 380 | 380 | 40 | 304 | HR-25 | 8 | 5 minutes |
| 7 | 380 | 380 | 40 | 304 | SCR-100, FE-2, and NaCl | 8 | 20 minutes |
| 8 | 380 | 380 | 40 | 304 | Sodium Phosphate Monobasic and NaCl | 8 | >1 hour |
| 9 | 380 | 380 | 40 | 304 | Sodium Phosphate Monobasic and NaCl | 8 | >3 hours in an atmospheric cement consistometer |

Referring to Table 2, Samples 1-7 that were prepared using conventional retarders either singly or in combination displayed gelation times of 20 minutes or less. However, the gelation times for Samples 8 and 9 that were prepared using SRAs of the type described herein, were increased to greater than 1 hour for Sample 8 and greater than 3 hours for sample 9. The results demonstrate the unexpected ability of SRAs of the type disclosed herein (i.e., mixtures of alkali metal halides and basic phosphate salts) to increase the gelation times of the cement compositions.

Example 2

The effect of the SRA amount on the thickening times of a calcium aluminate cement composition at various temperatures was investigated. Seventeen samples, designated Samples 10-26, were prepared using Class F fly ash, SECAR 51, SHMP, and SRA comprising NaCl, and $NaH_2PO_4$, and DI water in the amounts indicated in Table 3. The SRA ratio of $NaCl:NaH_2PO_4$ in Samples 10-26, were 1:1. The samples were heated to 150° F. in 42 minutes, to 200° F. in 55 minutes, or to 250° F. in 76 minutes and the pressures were increased from 1000 psi to 10,000 psi, as indicated in Table 3. The thickening times are presented in Table 3.

The results indicated that an addition of NaCl and $NaH_2PO_4$ at a 1:1 ratio to a mixture of SECAR 51, SHMP, fly ash, and water at temperatures from 150° F. to 250° F. caused the thickening times to increase.

Example 3

The effect of the $NaCl:NaH_2PO_4$ ratio in the SRA on the thickening times of a calcium aluminate cement composition was investigated. Eight samples, designated Samples 27-34, were prepared using Class F fly ash, SECAR 51, SHMP, an SRA comprising a mixture of NaCl, $NaHPO_4$, and DI water in the amounts indicated in Table 4. The ratio of $NaCl:NaH_2PO_4$ in Samples 27-30 and 32-34, was 2:1, while the ratio in Sample 31 was 1:2. The samples were cured at 150° F. for 42 minutes, at 200° F. for 55 minutes, or at 250° F. for 76 minutes and the p were increased from 1000 psi to 10,000 psi as indicated in Table 4. The thickening times are presented in Table 4.

TABLE 3

| | Ingredients | | | | | | Thickening time | | |
| --- | --- | --- | --- | --- | --- | --- | --- | --- | --- |
| | | | | | | | 150° F. in 42 min | 200° F. in 55 min | 250° F. in 76 min |
| Sample | fly ash (g) | SECAR 51 (g) | SHMP (g) | NaCl (g) | $NaH_2PO_4$ (g) | DI Water (g) | 1000 to 10,000 psi | 1000 to 10,000 psi | 1000 to 10,000 psi |
| 10 | 380 | 380 | 40 | 8 | 8 | 304 | 1:22 | | |
| 11 | 380 | 380 | 40 | 12 | 12 | 304 | 5:17 | | |
| 12 | 380 | 380 | 40 | 12.8 | 12.8 | 304 | 5:15 | | |
| 13 | 380 | 380 | 40 | 13.6 | 13.6 | 304 | 5:01 | | |
| 14 | 380 | 380 | 40 | 14.4 | 14.4 | 304 | 7:58 | | |
| 15 | 380 | 380 | 40 | 16 | 16 | 304 | 12:17 | | |
| 16 | 380 | 380 | 40 | 18.4 | 18.4 | 304 | 12:32 | 1:45 | |
| 17 | 380 | 380 | 40 | 19.2 | 19.2 | 304 | | 1:18 | |
| 18 | 380 | 380 | 40 | 20 | 20 | 304 | 19:00 | 3:08 | 1:59 |
| 19 | 380 | 380 | 40 | 20.4 | 20.4 | 304 | | 5:09 | |
| 20 | 380 | 380 | 40 | 21 | 21 | 304 | | 5:10 | 1:35 |
| 21 | 380 | 380 | 40 | 22 | 22 | 304 | | 6:00 | |
| 22 | 380 | 380 | 40 | 23 | 23 | 304 | | 5:43 | 1:19 |
| 23 | 380 | 380 | 40 | 25 | 25 | 304 | | 7:22 | 3:46 |
| 24 | 380 | 380 | 40 | 26 | 26 | 304 | | | 3:45 |
| 25 | 380 | 380 | 40 | 28 | 28 | 304 | | | 11:33 |
| 26 | 380 | 380 | 40 | 30 | 30 | 304 | | 24+ | 11:00 |

TABLE 4

| | Ingredients | | | | | | Thickening time | | |
| --- | --- | --- | --- | --- | --- | --- | --- | --- | --- |
| | | | | | | | 150° F. in 42 min | 200° F. in 55 min | 250° F. in 76 min |
| Sample | fly ash (g) | SECAR 51 (g) | SHMP (g) | NaCl (g) | $NaH_2PO_4$ (g) | DI Water (g) | 1000 to 10,000 psi | 1000 to 10,000 psi | 1000 to 10,000 psi |
| 27 | 380 | 380 | 40 | 8 | 4 | 304 | 0:25 | | |
| 28 | 380 | 380 | 40 | 10.8 | 5.4 | 304 | 7:20 | | |
| 29 | 380 | 380 | 40 | 13.2 | 6.6 | 304 | 9:58 | | |
| 30 | 380 | 380 | 40 | 17.07 | 8.53 | 304 | 10:45 | | |
| 31 | 380 | 380 | 40 | 8.53 | 17.07 | 304 | 0:46 | | |
| 32 | 380 | 380 | 40 | 21.3 | 10.7 | 304 | | 2:04 | 1:15 |
| 33 | 380 | 380 | 40 | 26.7 | 13.3 | 304 | | 2:55 | |
| 34 | 380 | 380 | 40 | 33.3 | 16.7 | 304 | | 6:33 | |

The results indicated that addition of a mixture comprising 2:1 NaCl:NaH$_2$PO$_4$ to the slurries also provides for an increase in thickening time.

Example 4

A comparative example to investigate the thickening times of a calcium aluminate cement composition lacking an SRA of the type described herein is presented. Five samples, designated Samples 35-39, were prepared using Class F fly ash, SECAR 51, SHMP, NaCl, NaH$_2$PO$_4$, and DI water in the amounts indicated in Table 5. Samples 35-37 and 39 contained alkali halide while Sample 38 contained alkali phosphate monobasic. In addition, the amount of SHMP in Sample 37 was increased from 40 g to 60 g. The samples were heated to 200° F. in 55 minutes and the pressures were increased from 1000 psi to 10,000 psi as indicated in Table 5. Also shown is the data for Sample 18 from Example 2. The thickening times are presented in Table 5.

ing NaH$_2$PO$_4$ as well as calcium aluminate cement compositions comprising NaH$_2$PO$_4$ and lacking NaCl were lower when compared to the thickening times of calcium aluminate cement compositions comprising both NaCl and NaH$_2$PO$_4$ (i.e., SRA) as shown in Examples 1-3. The results demonstrate the surprising synergy of the components of the SRA used (i.e., NaCl and NaH$_2$PO$_4$) whose individual components when added to the wellbore servicing composition resulted in similar thickening times.

Example 5

The effect of dispersants on the thickening times of calcium aluminate cement compositions comprising an SRA of the type described herein was investigated. Four samples, designated Samples 40-43, were prepared using Class F fly ash, SECAR 51, SHMP, NaCl, NaH$_2$PO$_4$, ethylenediamine-

TABLE 5

| | Ingredients | | | | | Thickening time 200° F. in 55 min |
|---|---|---|---|---|---|---|
| Sample | fly ash (g) | SECAR 51 (g) | SHMP (g) | NaCl (g) | NaH$_2$PO$_4$ (g) | DI Water (g) | 1000 to 10,000 psi hours:mins |
| 35 | 380 | 380 | 40 | 48 | 0 | 304 | 1:21 |
| 36 | 380 | 380 | 40 | 20 | 0 | 304 | 1:24 |
| 37 | 380 | 380 | 60 | 20 | 0 | 304 | 1:42 |
| 18 | 380 | 380 | 40 | 20 | 20 | 304 | 3:08 |
| 38 | 380 | 380 | 40 | 0 | 20 | 304 | 0:12 |
| 39 | 380 | 380 | 40 | 40 | 0 | 304 | 1:48 | tetraacetic acid (EDTA), sodium citrate, and deionized water in the amounts indicated in Table 6. The samples were heated to 150° F. in 42 minutes and the pressures were increased from 1000 psi to 10,000 psi and the thickening times are presented in Table 6.

TABLE 6

| | Ingredients | | | | | | | | Thickening time |
|---|---|---|---|---|---|---|---|---|---|
| Sample | fly ash (g) | SECAR 51 (g) | SHMP (g) | NaCl (g) | NaH$_2$PO$_4$ (g) | EDTA (g) | Sodium Citrate (g) | DI Water (g) | 150° F. in 42 min 1000 to 10,000 psi hours:mins |
| 40 | 380 | 380 | 40 | 4 | 2 | 8 | 4 | 304 | 7:00 |
| 41 | 380 | 380 | 40 | 4 | 2 | 8 | 2 | 304 | 6:38 |
| 42 | 380 | 380 | 40 | 2 | 1 | 8 | 1 | 304 | 5:55 |
| 43 | 380 | 380 | 40 | 8 | 4 | 8 | 0 | 304 | 7:45 |

The results indicate a synergistic effect of the combination of NaH$_2$PO$_4$ and NaCl as an SRA for the CAC/fly ash/SHMP/water system. Sample 36 containing 40g of SHMP and 20 g of NaCl had a thickening time of 1:24. Increasing the phosphate containing SHMP by 20 g (sample 37) did not significantly increase the thickening time (1:42). However when the SHMP was kept at 40 g and 20 g of NaH$_2$PO$_4$ was added (Sample 18), the thickening time increased to 3:08.

The results also indicated the thickening times of calcium aluminate cement compositions comprising NaCl and lack- The results indicated that the presence of dispersants in calcium aluminate cement compositions comprising SRAs did not affect the thickening times of the compositions.

Example 6

The compressive strengths of calcium aluminate cement compositions comprising SRAs was investigated. Five samples, designated Samples 44-48, were prepared using Class F fly ash, SECAR 51, SHMP, NaCl, NaH$_2$PO$_4$, EDTA, sodium citrate, and deionized water in the amounts indicated in Table 7. Sample 49 is a comparative sample which contained the conventional set retarders citric acid and tartaric acid. The samples were heated to 150° F. in 42 minutes, to 200° F. in 55 minutes, or to 250° F. in 76 minutes as indicated in Table 7. The 24 hour compressive strengths were determined using an ultrasonic cement analyzer (UCA) and the results are presented in Table 7.

TABLE 7

| Sample | Ingredients | | | | | | | | 24 h Compressive Strength (psi) | | |
|---|---|---|---|---|---|---|---|---|---|---|---|
| | fly ash (g) | SECAR 51 (g) | SHMP (g) | NaCl (g) | NaH$_2$PO$_4$ (g) | EDTA (g) | Sodium Citrate (g) | DI Water (g) | 150° F. in 42 min | 200° F. in 55 min | 250° F. in 76 min |
| 44 | 380 | 380 | 40 | 12 | 12 | 0 | 0 | 304 | 1547 | | |
| 45 | 380 | 380 | 40 | 20.4 | 20.4 | 0 | 0 | 304 | | 1309 | |
| 46 | 380 | 380 | 40 | 22 | 22 | 0 | 0 | 304 | | 777 | |
| 47 | 380 | 380 | 40 | 25 | 25 | 0 | 0 | 304 | | | 1537 |
| 48 | 380 | 380 | 40 | 2 | 1 | 8 | 1 | 304 | 1322 | | |
| | fly ash (g) | SECAR 60 (g) | SHMP (g) | Citric Acid (g) | Tartaric Acid (g) | EDTA (g) | Sodium Citrate (g) | DI Water (g) | 150° F. in 42 min | 200° F. in 55 min | 250° F. in 76 min |
| 49 | 380 | 380 | 40 | 8 | 8 | 0 | 0 | 304 | | 1120 | |

The results indicated that the 24 hour compressive strengths were comparable to an otherwise similar calcium aluminate cement composition comprising a conventional retarder and lacking an SRA of the type disclosed herein (Sample 49).

While embodiments of the disclosure have been shown and described, modifications thereof can be made by one skilled in the art without departing from the spirit and teachings of the disclosure. The embodiments described herein are exemplary only, and are not intended to be limiting. Many variations and modifications of the disclosure disclosed herein are possible and are within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_L$, and an upper limit, $R_U$, is disclosed, any number falling within the range is specifically disclosed. In particular, the following numbers within the range are specifically disclosed: $R=R_L+k*(R_U-R_L)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the embodiments of the present disclosure. The discussion of a reference herein is not an admission that it is prior art to the present disclosure, especially any reference that may have a publication date after the priority date of this application. The disclosures of all patents, patent applications, and publications cited herein are hereby incorporated by reference, to the extent that they provide exemplary, procedural, or other details supplementary to those set forth herein.

What is claimed is:

1. A method of servicing a wellbore comprising:
preparing a composition comprising a calcium aluminate cement, water, a polyphosphate, a pozzolan, and a set retarding agent, wherein the set retarding agent comprises an alkali halide and a basic phosphate salt;
placing the composition in the wellbore; and
allowing the composition to set.

2. The method of claim 1 wherein the calcium aluminate cement comprises aluminum oxide and calcium oxide having a ratio of aluminum oxide:calcium oxide of from about 1:1 to about 4:1.

3. The method of claim 2 wherein the aluminum oxide is present in the calcium aluminate cement in an amount of from about 30 wt. % to about 80 wt. %, based upon the total weight of calcium alumina cement.

4. The method of claim 1 wherein the composition further comprises a polymeric phosphate salt.

5. The method of claim 4 wherein the polymeric phosphate salt comprises polymeric salts of alkali metal salt, sodium (hexa)metaphosphate, sodium tripolyphosphate, or combinations thereof.

6. The method of claim 1 wherein the composition further comprises a conventional set retarder.

7. The method of claim 6 wherein the conventional set retarder comprises organic acid, citric acid, tartaric acid, oxalic acid, gluconic acid, oleic acid, phosphoric acid, uric acid, ethylenediaminetetraacetic acid, alkali metal salt of organic acid, sodium citrate, lignosulfonate retarder, nonlignosulfonate retarder, or combinations thereof.

8. The method of claim 1 wherein the alkali halide comprises sodium chloride, calcium chloride, potassium chloride, or combinations thereof.

9. The method of claim 1 wherein the basic phosphate salt comprises monobasic phosphate salt, sodium phosphate monobasic, calcium phosphate monobasic, potassium phosphate monobasic, a dibasic phosphate salt, sodium phosphate dibasic, calcium phosphate dibasic, potassium phosphate dibasic, a tribasic phosphate salt, sodium phosphate tribasic, calcium phosphate tribasic, potassium phosphate tribasic, or combinations thereof.

10. The method of claim 1 wherein the set retarding agent has a ratio of alkali halide:basic phosphate salt of from about 3:1 to about 1:3.

11. The method of claim 1 wherein the set retarding agent comprises sodium chloride and sodium phosphate monobasic in a ratio of from about 3:1 to about 1:3.

12. The method of claim 1 wherein the set retarding agent is present in the composition in an amount of from about 0.1 wt. % to about 15 wt. %, based upon the total weight of the servicing composition.

13. The method of claim 1 wherein the calcium aluminate cement is present in the composition in an amount of from about 30 wt. % to about 60 wt. %, based upon the total weight of composition.

14. The method of claim 1 wherein the water is present in the composition in an amount of from about 20 wt.% to about 180 wt.% based upon the total weight of the cement.

15. The method of claim 4 wherein the polymeric phosphate salt is present in the composition in an amount of from about 1 wt. % to about 20 wt. %, based upon the total weight of the composition.

16. The method of claim 1 wherein the pozzolan comprises class F fly ash.

17. The method of claim 1 wherein the pozzolan is present in the composition in an amount of from about 30 wt. % to about 60 wt. %, based upon the total weight of the composition.

18. The method of claim 1 wherein the composition has a thickening time of greater than about 1 hour.

19. The method of claim 1 wherein the set cement has a compressive strength of from about 250 psi to about 20,000 psi.

20. A composition comprising:
a calcium aluminate cement in an amount of from about 30 wt. % to about 60 wt. % and set retarding agent in an amount of from about 0.1 wt. % to about 15 wt. % based upon the total weight of the composition, wherein the set retarding agent comprises an alkali halide and a basic phosphate salt in a ratio of from about 3:1 to about 1:3.

* * * * *